July 13, 1937. H. DREYFUS 2,086,701
HYDROLYSIS OF CELLULOSE
Filed Aug. 16, 1934
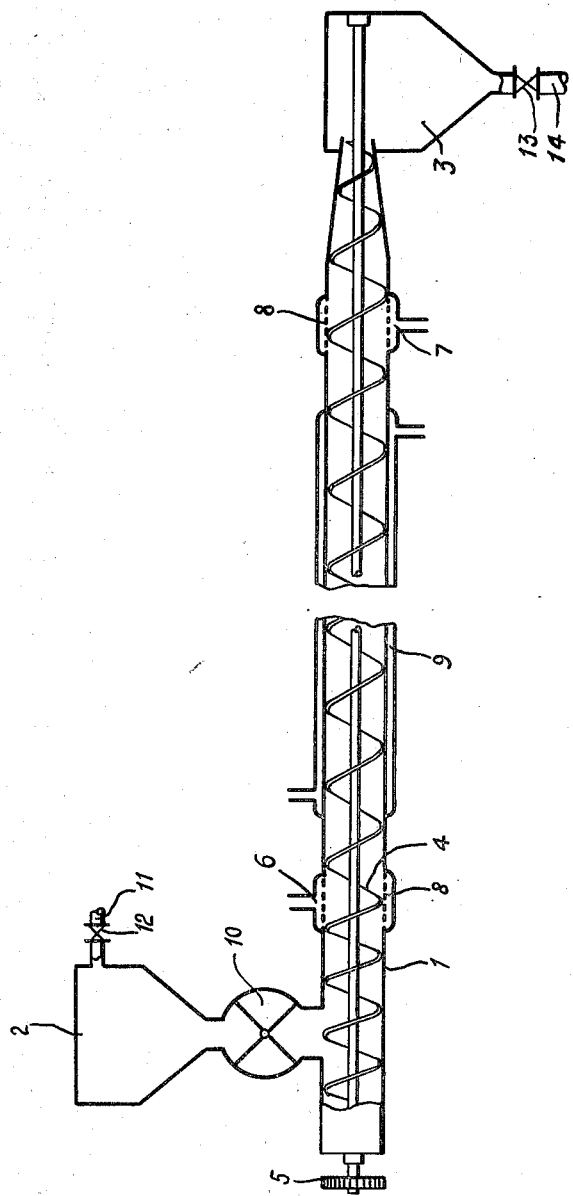
HENRY DREYFUS
INVENTOR
ATTORNEYS Patented July 13, 1937

2,086,701

UNITED STATES PATENT OFFICE 2,086,701

HYDROLYSIS OF CELLULOSE

Henry Dreyfus, London, England

Application August 16, 1934, Serial No. 740,100
In Great Britain August 30, 1933

9 Claims. (Cl. 127—37)

This invention relates to the manufacture of sugars and similar substances by the hydrolysis of cellulose and cellulose containing materials by means of hydrolyzing agents.

I have found that the hydrolysis of cellulosic materials such as wood waste, sawdust etc. may advantageously be effected by heating the cellulosic materials with a hydrolyzing agent in a reaction vessel, continuously or intermittently feeding fresh cellulosic material and hydrolyzing agent into the vessel and continuously or intermittently discharging the product of the hydrolysis from the vessel.

As a hydrolyzing agent I prefer to employ dilute sulphuric acid, but other acids or solutions of acid salts may be employed if desired.

In one method in which the invention may be put into practice wood waste such as sawdust may be formed into a fluid or semi-fluid pulp or paste by admixture with a suitable liquid such as water or dilute acid. This pulp or paste may then be forced, for example by means of pumps, into the converter, into which acid may also be passed if required. At the discharge end of the vessel the dilute acid and solid material remaining may be discharged in a continuous manner and allowed to cool. The solid matter may be separated from the dilute acid in any convenient way, for example by settling, filtration or centrifuging. The converter employed may conveniently be of a cylindrical type, and is preferably provided with a heating jacket; it may be horizontal or vertical or inclined at any angle to the horizontal. Inlets may be provided at one end for the pulp or paste comprising the cellulosic material and for the dilute acid, and one or more outlets for the products may be provided at the other end of the vessel.

According to one form of the invention provision may be made for the withdrawal of at least part of the liquid contents of the vessel free or substantially free from solids; for example the converter may possess an outlet for the liquid combined with a filtering means whereby the solids are prevented from passing through the said outlet, as well as an outlet through which the solid material together with a certain amount of liquid may be discharged. In such a case the outlet for the liquid alone may communicate with a zone of considerably lower pressure than does the outlet for the solid products. In another form of the invention the solid and liquid products may be discharged together and may subsequently be separated.

The rates at which the solid and liquid materials are introduced into the converter will vary with, among other things, the particular form of the invention which is adopted. Thus when the solid and liquid materials are discharged wholly together it is preferable to cause them to enter and pass through the converter at a rate such that they are in the converter and exposed to the reaction conditions for a comparatively short period of time, for example, less than two hours or less than an hour. In such a case the solid material remaining after the reaction may still contain a considerable proportion of unchanged or partly hydrolyzed cellulosic materials and may with advantage be subjected to a further treatment. Thus it may be returned to the input end of the converter, preferably after replacement of a certain proportion by fresh untreated material, or it may be passed to one or more succeeding converters and subjected to further hydrolysis therein; such hydrolysis is preferably effected by means of fresh acid liquor in each converter.

If, on the other hand, provision is made whereby liquid may be removed from the converter free from solid material, the rate of flow of the acid may be increased relatively to that of the solid material, so that while the acid solution still passes through the converter in a comparatively short space of time, the solid material is in the reaction zone for a considerably greater time, for example up to 10 or 16 hours or more. By adopting this procedure the cellulosic material may be substantially completely hydrolyzed in a single stage.

The concentration of the acid employed may vary but it is preferable to employ concentrations of less than 1% and for instance between 0.05% and 1% and especially between 0.1% or 0.2% and 0.5%. When employing apparatus, as explained above, in which the liquid and solid are discharged together the amount of acid solution with which a given quantity of cellulosic material is treated may with advantage be such that the total amount of acid, reckoned as anhydrous acid, employed in all stages in the case of a multi stage treatment, is between about 1% and 4% of the cellulosic material, and especially between about 1.5% and 2.5%. When, on the other hand, provision is made for the liquid products to escape independently of the solid products of the reaction and the operation is conducted in a single stage, the rate of flow of the acid may be adapted so that this or a somewhat larger quantity of acid, equivalent for example to 6, 8 or 10% of anhydrous acid, passes through the converter in the same time as the corresponding quantity of solid material.

The temperature at which the hydrolysis is performed is preferably above 100° C., for instance, between about 120° and 200° C., and especially between 160° and 190° C. In order to maintain the water present in the liquid form at such temperature it is, of course, necessary to work under pressure; the pressure may be that produced by the water vapour, or pressures exceeding the vapour pressure of water at the temperature employed by a margin of two or more atmospheres may be produced by the addition of inert gases such as nitrogen or in any other way; for example, pressures up to about 15 or 20 atmospheres may be used according to the temperature.

In order to obtain the cellulosic material in the form of a pulp or paste which may conveniently be pumped or otherwise forced into the converter the material may be admixed with either water or dilute acid. If the material is mixed with water, the acid may be led separately into the converter; if with acid, further acid may if desired be led in separately; in any case the amounts of acid and water should be adjusted so as to obtain the desired acid concentration in the converter.

After leaving the converter the acid liquid, whether or not in admixture with solid material, is preferably cooled as rapidly as possible, and such cooling may conveniently be effected at least partly by heat exchange with water or dilute acid to be used in the process.

In a convenient method of carrying out the invention dilute acid may be heated under the required pressure, for example at least partly by heat exchange with the products leaving the converter, to a temperature of between about 160° and 190° C. At the same time sawdust or similar wood waste material may be mixed with sufficient water to produce a composition of the required fluidity and this may also be heated to the reaction temperature under the necessary pressure. The wood waste and the acid solution may be admitted simultaneously at one end of a horizontal converter which is jacketed and maintained at a temperature exceeding that at which the hydrolysis is to be effected by, for example, about 10° or 15° C., for instance, by means of superheated steam. The proportions in which the acid and the wood waste are employed may be adjusted as already described according to the nature of the process and the concentration of the acid. If a process in which the liquid and the solid materials are discharged wholly together is used the discharged products, after being passed in heat exchange with the water employed for the preparation of the dilute acid, and/or with the dilute acid itself, may be subjected to filtration or other process whereby the acid solution may be obtained free from the solid materials. If, on the other hand, liquid products are discharged independently of the solid materials they may be passed in heat exchange with the water and/or dilute acid, as above described, and may then be employed in any desired way. The solid products which, together with a certain quantity of the acid liquor, are also continuously separately discharged may advantageously be subjected to filtration or other separation process whereby they may be freed from the acid liquor, and this liquor may be added to that directly discharged. The solids remaining may, if desired, be used as fuel or in any other way, or they may, wholly or in part, be returned to the process.

By the process of the invention very good yields of fermentable sugars are obtained and the amount of sugar commonly lost by decomposition is much reduced. The fermentable sugars may conveniently be employed while still in solution for the manufacture of ethyl alcohol and/or other products by fermentation. It is usually necessary first to neutralize the acid remaining after the hydrolysis, for example, with lime, chalk or sodium carbonate, and it is also advantageous to add substances capable of acting as nutrients for the fermentation organisms, for example, phosphates. If desired, however, the liquid may be allowed to stand before neutralization for any desired length of time or other means may be adopted in order to promote complete hydrolysis to fermentable sugars. The details of the fermentation will, of course, depend on the nature of the product desired.

Although the invention has been described particularly with respect to two methods of application it is, of course, in no way limited thereto, and other methods of putting the invention into practice may be adopted. For example the solid cellulosic material may be run in counter-current to the acid through the converter.

A form of apparatus which may be employed in the process of the invention is illustrated diagrammatically in the drawing. It consists of a tubular reaction vessel 1, a container 2 for the cellulosic material and a discharge vessel 3 for the solid products of the reaction. The reaction vessel 1 is provided with a screw 4 running along its length, driven by a gear wheel 5, and with an inlet 6 and an outlet 7 for the liquids employed in the reaction. The inlet 6 is positioned near to the inlet for the solid material, and the outlet 7 towards the discharge end of the reaction vessel 1, so that the material in its passage from the container 2 through the reaction vessel 1 to the discharge vessel 3 passes first the liquid inlet 6 and later the liquid outlet 7. Between the outlet 7 and the discharge vessel 3 the reaction vessel 1 and the screw 4 are tapered to a somewhat smaller diameter. The liquid inlet 6 and outlet 7 communicate with the interior of the reaction vessel 1 through perforations 8, which may be backed with gauze or other fine filtering means.

The central section of the reaction vessel 1 is provided with a heating jacket 9 through which steam or other heating agents may be passed, and the remainder of the reaction vessel 1 and the discharge vessel 3 are preferably lagged with a heat insulating material (not shown in the drawing).

Between the cellulose container 2 and the reaction vessel 1 is a rotary valve 10 whereby the material may be fed from the container 2 to the reaction vessel 1. The container 2 is provided with a tube 11 and a valve 12 communicating with a source of pressure such as compressed air. The discharge vessel 3 is provided with a valve 13 and outlet 14. The liquid outlet 7 communicates with a cooled receiver for the liquid products of the reaction (not shown).

The pitch of the screw 4 varies, being longer between the liquid inlet 6 and outlet 7 so that the cellulose material is less tightly packed between these points, thus allowing a better contact with the acid and offering less resistance to the flow of acid. The screw between these points is provided with perforations through which the acid can pass but which do not allow the passage of substantial quantities of the cellulosic materials.

In operation the reaction vessel 1 is heated to the desired temperature by the jacket 9 and cellulosic material under pressure in the container 2 is fed by the rotary valve 10 into the reaction vessel 1 where it is carried by the screw 4 along the vessel. Preferably the cellulosic material is employed in the form of a pulp with either dilute acid or water. Further acid is forced by pressure through the inlet 6 into the reaction vessel 1 and passes through the reaction vessel to the outlet 7 whence it is led into the cooled receiver. Owing to the difference in temperature between the contents of the receiver and that of the reaction vessel 1 a pressure drop exists between the reaction vessel 1 and the receiver across the outlet 7, and this pressure difference aids the passage of the liquor from the reaction vessel to the receiver. The solid products of the reaction together with a certain amount of acid liquor, are carried to the discharge vessel 3, whence they may be run off by means of the valve 13 and outlet 14. If desired the acid liquor may be separated from the solid material and added to that in the receiver.

The rate of travel of the cellulosic material, which is governed by the rate of rotation of the screw, is such that the material takes about 12 hours to pass through the reaction vessel to the discharge vessel 3. The pressure on the acid is adjusted so that the acid requires less than 2 hours, preferably about half an hour to an hour, to pass from the inlet 6 to the outlet 7.

What I claim and desire to secure by Letters Patent is:—

1. Process for the manufacture of hydrolysis products of cellulose, which comprises continuously feeding cellulosic material through a reaction vessel, continuously and more rapidly feeding a dilute hydrolyzing solution through the said vessel, heating the material and solution in the said vessel to a temperature exceeding 100° C., and continuously discharging the solution of hydrolysis products so formed and the solid residue from the said vessel.

2. Process for the manufacture of hydrolysis products of cellulose, which comprises continuously feeding cellulosic material through a reaction vessel, continuously and more rapidly feeding a dilute hydrolyzing solution through the said vessel, heating the material and solution in the said vessel to a temperature exceeding 100° C., and continuously and separately discharging the solution of hydrolysis products so formed and the solid residue from the said vessel.

3. Process for the manufacture of hydrolysis products of cellulose, which comprises continuously feeding cellulosic material through a reaction vessel, continuously and more rapidly feeding a dilute hydrolyzing solution through the said vessel, heating the material and solution in the said vessel to a temperature exceeding 100° C., continuously and separately discharging the solution of hydrolysis products so formed and the solid residue from the said vessel, and rapidly cooling the discharged solution.

4. Process for the manufacture of hydrolysis products of cellulose, which comprises continuously feeding cellulosic material through a reaction vessel, continuously and more rapidly feeding a dilute solution of an acid-reacting substance through the said vessel, heating the material and solution in the said vessel to a temperature exceeding 100° C., and continuously discharging the solution of hydrolysis products so formed and the solid residue from the said vessel.

5. Process for the manufacture of hydrolysis products of cellulose, which comprises continuously feeding cellulosic material through a reaction vessel, simultaneously and more rapidly feeding dilute sulphuric acid through the said vessel, heating the material and acid in the said vessel to a temperature of 120–200° C., and separately discharging the solution of hydrolysis products so formed and the solid residue from the said vessel.

6. Process for the manufacture of hydrolysis products of cellulose, which comprises continuously feeding cellulosic material through a reaction vessel, simultaneously and more rapidly feeding sulphuric acid of concentration below 1% through the said vessel, heating the material and acid in the said vessel to a temperature of 160–190° C., separately discharging the solution of hydrolysis products so formed and the solid residue from the said vessel, and rapidly cooling the discharged solution.

7. Process for the manufacture of hydrolysis products of cellulose, which comprises continuously feeding cellulosic material through a reaction vessel, continuously and more rapidly feeding a dilute solution of an acid-reacting substance through the said vessel, heating the material and solution in the said vessel to a temperature of 120–200° C., and continuously discharging the solution of hydrolysis products so formed and the solid residue from the said vessel.

8. Process for the manufacture of hydrolysis products of cellulose, which comprises continuously feeding cellulosic material through a reaction vessel, continuously and more rapidly feeding a dilute hydrolyzing solution in the same direction through the said vessel, heating the material and solution in the said vessel to a temperature exceeding 100° C., and continuously discharging the solution of hydrolysis products so formed and the solid residue from the said vessel.

9. Process for the manufacture of hydrolysis products of cellulose, which comprises continuously feeding cellulosic material through a reaction vessel, continuously and more rapidly feeding a dilute hydrolyzing solution in the same direction through the said vessel, heating the material and solution in the said vessel to a temperature exceeding 100° C., and continuously and separately discharging the solution of hydrolysis products so formed and the solid residue from the said vessel.

HENRY DREYFUS.